United States Patent
Niroula et al.

(10) Patent No.: US 12,481,719 B2
(45) Date of Patent: Nov. 25, 2025

(54) SYSTEMS AND METHODS FOR IMPLEMENTING ALL-TO-ALL CONNECTIVITY IN GATE-BASED QUANTUM COMPUTERS USING NEAREST-NEIGHBOR INTERACTIONS

(71) Applicant: JPMORGAN CHASE BANK, N.A., New York, NY (US)

(72) Inventors: Pradeep Niroula, College Park, MD (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1015 days.

(21) Appl. No.: 17/644,488

(22) Filed: Dec. 15, 2021

(65) Prior Publication Data

US 2023/0185875 A1    Jun. 15, 2023

(51) Int. Cl.
*G06F 17/16*    (2006.01)
*G06N 10/20*    (2022.01)
*G06N 10/40*    (2022.01)

(52) U.S. Cl.
CPC ............. *G06F 17/16* (2013.01); *G06N 10/20* (2022.01); *G06N 10/40* (2022.01)

(58) Field of Classification Search
CPC ......... G06F 17/16; G06N 10/40; G06N 10/20
See application file for complete search history.

(56) References Cited

U.S. PATENT DOCUMENTS

| | | | |
|---|---|---|---|
| 11,995,517 B1* | 5/2024 | Fellner | G06N 10/60 |
| 2018/0218279 A1* | 8/2018 | Lechner | G06N 10/60 |
| 2022/0207402 A1* | 6/2022 | Lechner | G06N 10/40 |
| 2022/0343201 A1* | 10/2022 | Lechner | G06N 10/20 |
| 2023/0274175 A1* | 8/2023 | Lechner | G06F 30/392 |
| | | | 716/100 |

OTHER PUBLICATIONS

Lechner, Wolfgang. "Quantum approximate optimization with parallelizable gates." IEEE Transactions on Quantum Engineering 1 (2020): 1-6. (Year: 2020).*

(Continued)

*Primary Examiner* — Andrew T Chiusano
(74) *Attorney, Agent, or Firm* — GREENBERG TRAURIG LLP (57) ABSTRACT

A method for implementing all-to-all connectivity in gate-based quantum computers may include a classical computer program: receiving an optimization problem; constructing a problem Hamiltonian by assigning a qubit to each interactions between pairs of variables; associating each of the assigned qubits to a physical qubit in a physical qubit grid; assigning readout physical qubits in the physical qubit grid to neighbors of the associated physical qubits; instructing the quantum computer to apply a driving Hamiltonian and the problem Hamiltonian to the physical qubit grid; instructing the quantum computer to apply CNOT gates between associated physical qubits on edges of each triangle and square in the physical qubit grid and the readout physical qubits in centers of the triangles and squares; instructing the quantum computer to measure the readout physical qubits; and determining that the measurements of all readout physical indicates that parities between the physical qubits are enforced.

20 Claims, 4 Drawing Sheets

(56) References Cited

OTHER PUBLICATIONS

Lechner, Wolfgang, Philipp Hauke, and Peter Zoller. "A quantum annealing architecture with all-to-all connectivity from local interactions." Science advances 1.9 (2015): e1500838. (Year: 2015).*

Rocchetto, Andrea, Simon C. Benjamin, and Ying Li. "Stabilizers as a design tool for new forms of the Lechner-Hauke-Zoller annealer." Science advances 2.10 (2016): e1601246. (Year: 2016).*

Glaetzle, Alexander W., et al. "A coherent quantum annealer with Rydberg atoms." Nature communications 8.1 (2017): 15813. (Year: 2017).*

Pastawski, Fernando, and John Preskill. "Error correction for a proposed quantum annealing architecture." arXiv preprint arXiv:1511.00004 (2015). (Year: 2015).*

\* cited by examiner

SYSTEMS AND METHODS FOR IMPLEMENTING ALL-TO-ALL CONNECTIVITY IN GATE-BASED QUANTUM COMPUTERS USING NEAREST-NEIGHBOR INTERACTIONS

BACKGROUND OF THE INVENTION

1. Field of the Invention

Embodiments relate generally to systems and methods for implementing all-to-all connectivity in gate-based quantum computers using nearest-neighbor interactions.

2. Description of the Related Art

Quadratic optimization belongs to the family of computational problems that stand to benefit from quantum computers. These problems can be mapped to Hamiltonians and can be solved using adiabatic annealing or by using variational algorithms like Quantum Approximate Optimization Algorithm (QAOA).

One barrier preventing experimentation of quantum algorithms on industrial optimization problems is the restricted connectivity of quantum processors available today. The optimization problems that appear in the industry, such as portfolio optimization or scheduling, tend to involve variables that interact with all other variables. Translating such a problem to a quantum computer requires quantum processors with all-to-all connectivity. Most quantum processors available today have a restricted connectivity.

The second barrier in using quantum algorithms for optimization is noise. Because of noisy hardware without fault tolerance, any theoretical quantum advantage will quickly dissipate away. The effect of noise is worsened when a quantum processor with restricted connectivity is used to emulate an all-to-all architecture.

SUMMARY OF THE INVENTION

Systems and methods for implementing all-to-all connectivity in gate-based quantum computers using nearest-neighbor interactions are disclosed. According to one embodiment, a method for implementing all-to-all connectivity in gate-based quantum computers using nearest-neighbor interactions may include: (1) receiving, by a classical computer program, an optimization problem comprising a plurality of interactions between pairs of variables; (2) constructing, by the classical computer program, a problem Hamiltonian by assigning a qubit to each of the interactions between pairs of variables; (3) associating, by the classical computer program, each of the assigned qubits in the problem Hamiltonian to a physical qubit in a physical qubit grid in a quantum computer; (4) assigning, by the classical computer program, readout physical qubits in the physical qubit grid to neighbors of the associated physical qubits; (5) instructing, by the classical computer program, the quantum computer to apply a driving Hamiltonian to the physical qubit grid; (6) instructing, by the classical computer program, the quantum computer to apply the problem Hamiltonian to the physical qubit grid; (7) instructing, by the classical computer program, the quantum computer to apply CNOT gates between associated physical qubits on edges of each triangle and square in the physical qubit grid and the readout physical qubits in centers of the triangles and squares; (8) instructing, by the classical computer program, the quantum computer to measure the readout physical qubits; and (9) determining, by the classical computer program, that the measurements of all readout physical qubits indicates that parities between the physical qubits are enforced in the physical qubit grid.

In one embodiment, the classical computer program associates each of the assigned qubits in the problem Hamiltonian with the physical qubit in the physical qubit grid by traversing the physical qubit grid and associating each assigned qubit with the physical qubit and skipping a row between any two rows of assignment and assigns readout physical qubits in the physical qubit grid to neighbors of the associated physical qubits.

In one embodiment, the method may also include: receiving, by the classical computer program, a precision parameter K; and repeating, by the classical computer program, steps of instructing the quantum computer to apply the driving Hamiltonian to the physical qubit grid, instructing the quantum computer to apply the problem Hamiltonian to the physical qubit grid, instructing the quantum computer to apply CNOT gates between associated physical qubits on edges of each triangle and square in the physical qubit grid and the readout physical qubits in centers of the triangles and squares K times.

In one embodiment, the method may also include receiving, by the classical computer program, a precision parameter K; and initializing, by the classical computer program, a first vector and a second vector, each having a length of the precision parameter K, with a plurality of real number values. The classical computer program instructs the quantum computer to apply the driving Hamiltonian for a period of one of the real number values in the first vector and to apply the problem Hamiltonian for a period of one of the real number values in the second vector.

In one embodiment, the method may further include: receiving, by the classical computer program, a convergence criteria; instructing, by the classical computer program, the quantum computer to measure all associated physical qubits; calculating, by the classical computer program, an energy for the problem Hamiltonian using the measurements of the associated physical qubits; determining, by the classical computer program, that the energy for the problem Hamiltonian fits the convergence criteria; and outputting, by the classical computer program, the energy for the problem Hamiltonian.

In one embodiment, the energy of the problem Hamiltonian fits the convergence criteria when the energy of the problem Hamiltonian is within a predetermined amount of a prior energy of the problem Hamiltonian for a prior iteration.

According to another embodiment, a method for implementing all-to-all connectivity in gate-based quantum computers using nearest-neighbor interactions may include: (1) receiving, by a classical computer program, an optimization problem comprising a plurality of interactions between pairs of variables; (2) constructing, by the classical computer program, a problem Hamiltonian by assigning a qubit to each of the interactions between pairs of variables; (3) associating, by the classical computer program, each of the assigned qubits in the problem Hamiltonian to a physical qubit in a physical qubit grid in a quantum computer; (4) assigning, by the classical computer program, readout physical qubits in the physical qubit grid to neighbors of the associated physical qubits; (5) instructing, by the classical computer program, the quantum computer to apply a driving Hamiltonian to the physical qubit grid; (6) instructing, by the classical computer program, the quantum computer to apply the problem Hamiltonian to the physical qubit grid; (7) instructing, by the classical computer program, the quantum computer to apply CNOT gates between associated physical qubits on edges of each triangle and square in the physical qubit grid and the readout physical qubits in centers of the triangles and squares; (8) instructing, by the classical computer program, the quantum computer to measure the readout physical qubits; (9) determining, by the classical computer program, that the measurements of all readout physical qubits does not indicate that parities between the physical qubits are enforced in the physical qubit grid; (10) identifying, by the classical computer program, a parity check correction; (11) instructing, by the classical computer program, the quantum computer to apply the parity check correction to the physical qubit grid; (12) instructing, by the classical computer program, the quantum computer to measure the readout physical qubits a second time; and (13) determining, by the classical computer program, that the second measurements of all readout physical qubits indicates that parities between the physical qubits are enforced in the physical qubit grid.

In one embodiment, the parity check correction may include application of an X gate to one or more of the associated qubits and/or flipping of the measurement of one of the readout physical qubits.

In one embodiment, the classical computer program associates each of the assigned qubits in the problem Hamiltonian with the physical qubit in the physical qubit grid by traversing the physical qubit grid and associating each assigned qubit with the physical qubit and skipping a row between any two rows of assignment and assigns readout physical qubits in the physical qubit grid to neighbors of the associated physical qubits.

In one embodiment, the method may also include receiving, by the classical computer program, a precision parameter K; and repeating, by the classical computer program, steps of instructing the quantum computer to apply the driving Hamiltonian to the physical qubit grid, instructing the quantum computer to apply the problem Hamiltonian to the physical qubit grid, instructing the quantum computer to apply CNOT gates between associated physical qubits on edges of each triangle and square in the physical qubit grid and the readout physical qubits in centers of the triangles and squares K times.

In one embodiment, the method may also include receiving, by the classical computer program, a precision parameter K; and initializing, by the classical computer program, a first vector and a second vector, each having a length of the precision parameter K, with a plurality of real number values. The classical computer program instructs the quantum computer to apply the driving Hamiltonian for a period of one of the real number values in the first vector and to apply the problem Hamiltonian for a period of one of the real number values in the second vector.

In one embodiment, the method may also include: receiving, by the classical computer program, a convergence criteria; instructing, by the classical computer program, the quantum computer to measure all associated physical qubits; calculating, by the classical computer program, an energy for the problem Hamiltonian using the measurements of the associated physical qubits; determining, by the classical computer program, that the energy for the problem Hamiltonian fits the convergence criteria; and outputting, by the classical computer program, the energy for the problem Hamiltonian.

In one embodiment, the energy of the problem Hamiltonian fits the convergence criteria when the energy of the problem Hamiltonian is within a predetermined amount of a prior energy of the problem Hamiltonian for a prior iteration.

According to another embodiment, a system may include a quantum computer and a classical computer configured to receive an optimization problem comprising a plurality of interactions between pairs of variables, to construct a problem Hamiltonian by assigning a qubit to each of the interactions between pairs of variables, to associate each of the assigned qubits in the problem Hamiltonian to a physical qubit in a physical qubit grid in a quantum computer, to assign readout physical qubits in the physical qubit grid to neighbors of the associated physical qubits, to instruct the quantum computer to apply a driving Hamiltonian to the physical qubit grid, to instruct the quantum computer to apply the problem Hamiltonian to the physical qubit grid, to instruct the quantum computer to apply CNOT gates between associated physical qubits on edges of each triangle and square in the physical qubit grid and the readout physical qubits in centers of the triangles and squares, and to instruct the quantum computer to measure the readout physical qubits.

In one embodiment, the classical computer may be also configured to determine that the measurements of all readout physical qubits does not indicate that parities between the physical qubits are enforced in the physical qubit grid, identify a parity check correction, to instruct the quantum computer to apply the parity check correction to the physical qubit grid, to instruct the quantum computer to measure the readout physical qubits a second time, and to determine that the second measurements indicates that parities between the physical qubits are enforced in the physical qubit grid.

In one embodiment, the parity check correction may include application of an X gate to one or more of the associated qubits and/or flipping of the measurement of one of the readout physical qubits.

In one embodiment, the classical computer may be also configured to associate each of the assigned qubits in the problem Hamiltonian with the physical qubit in the physical qubit grid by traversing the physical qubit grid and associating each assigned qubit with the physical qubit and skipping a row between any two rows of assignment and assigns readout physical qubits in the physical qubit grid to neighbors of the associated physical qubits.

In one embodiment, the classical computer may be also configured to receive a precision parameter K and repeat instructing the quantum computer to apply the driving Hamiltonian to the physical qubit grid, instructing the quantum computer to apply the problem Hamiltonian to the physical qubit grid, instructing the quantum computer to apply CNOT gates between associated physical qubits on edges of each triangle and square in the physical qubit grid and the readout physical qubits in centers of the triangles and squares K times.

In one embodiment, the classical computer may be also configured to receive a precision parameter K, to initialize a first vector and a second vector, each having a length of the precision parameter K, with a plurality of real number values, and to instruct the quantum computer to apply the driving Hamiltonian for a period of one of the real number values in the first vector and the problem Hamiltonian for a period of one of the real number values in the second vector.

In one embodiment, the classical computer may be also configured to receive a convergence criteria, to instruct the quantum computer to measure all associated physical qubits, to calculate an energy for the problem Hamiltonian using the measurements of the associated physical qubits, to determine that the energy for the problem Hamiltonian fits the convergence criteria, and to output the energy for the problem Hamiltonian, wherein the energy of the problem Hamiltonian fits the convergence criteria when the energy of the problem Hamiltonian is within a predetermined amount of a prior energy of the problem Hamiltonian for a prior iteration.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for implementing all-to-all connectivity in gate-based quantum computers using nearest-neighbor interactions. All-to-all connectivity refers to an architecture where each physical qubit can interact directly without another physical qubit, in a sense that a two-qubit gate can be applied directly on the pair without using any other auxiliary qubits.

Figure 1:
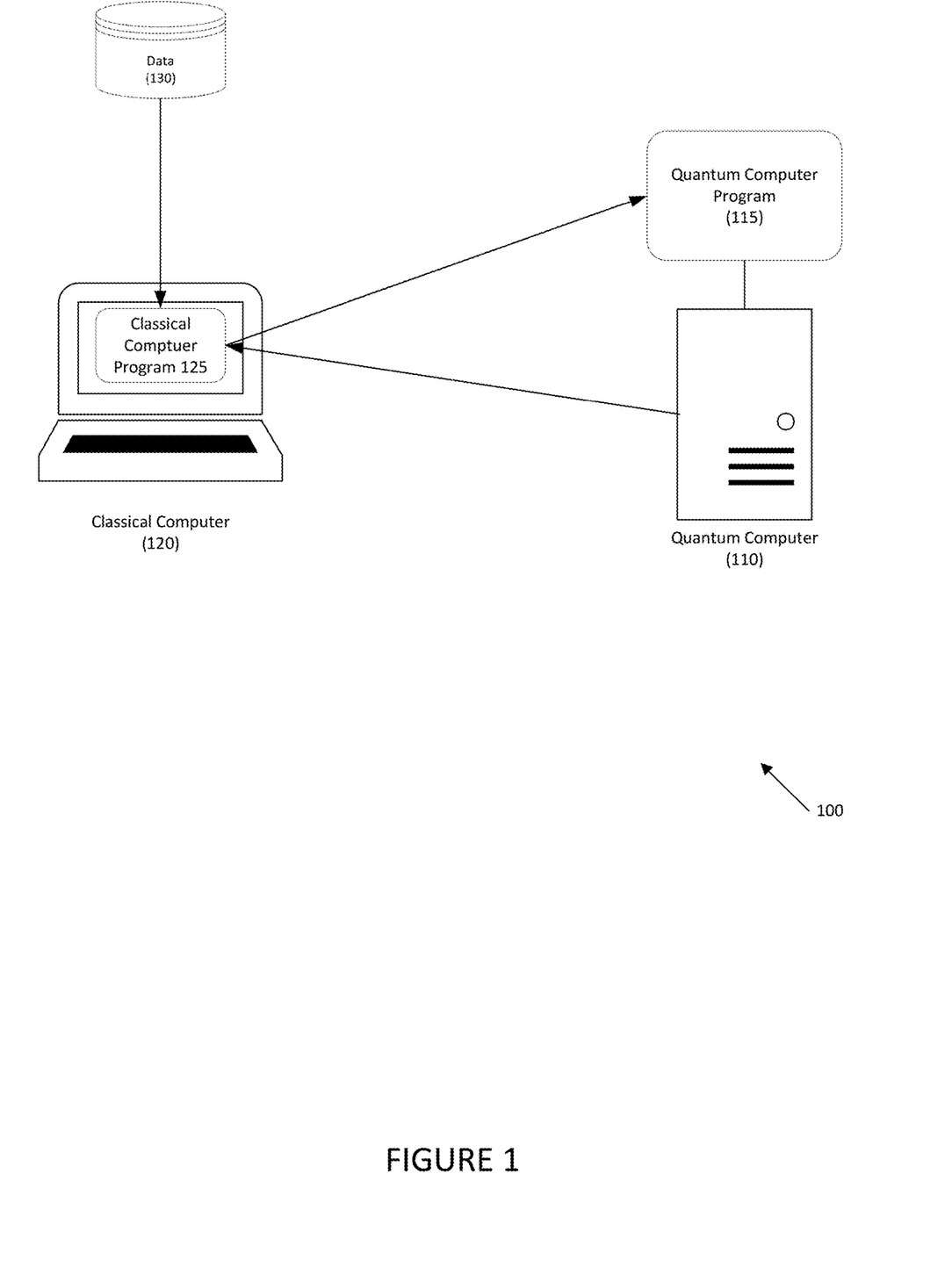
FIG. 1 depicts a system for implementing all-to-all connectivity in gate-based quantum computers using nearest-neighbor interactions according to one embodiment.

Referring to FIG. 1, a system for implementing all-to-all connectivity in gate-based quantum computers using nearest-neighbor interactions is disclosed. System 100 may include quantum computer 110 that may execute quantum computer program 115. Classical computer 120 may interface with quantum computer program 115 using classical computer program 125. Classical computer 120 may be any suitable classical computing device, including servers, workstations, desktop, notebook, laptop, or tablet computers, etc.

Quantum computer 110 may be a Noisy Intermediate-Scale Quantum (NISQ) computer.

Classical computer program 125 may provide input to, and receive output from, quantum computer 110 and/or quantum computer program 115. In one embodiment, classical computer program 125 may generate one or more quantum computer programs 115, such as one or more quantum circuits, and may provide one or more quantum computer programs 115 to quantum computer 110. Classical computer program 125 may receive the results of the execution of the one or more quantum computer programs 115.

Database 130 may be a source of data. For example, the input data may include problems with interactions between variables. An example of such a problem is an optimization problem involving interactions between pairs of N binary variables.

In one embodiment, classical computer program 125 may create one or more quantum circuits that implement at least portions of a quantum program. Classical computer program 125 may then transpile the quantum circuit(s) and may then send the transpiled circuit(s) to the quantum computer for execution. Classical computer program 125 may receive the results from the quantum computer and output them for the user, for downstream systems, etc.

Figure 2A:
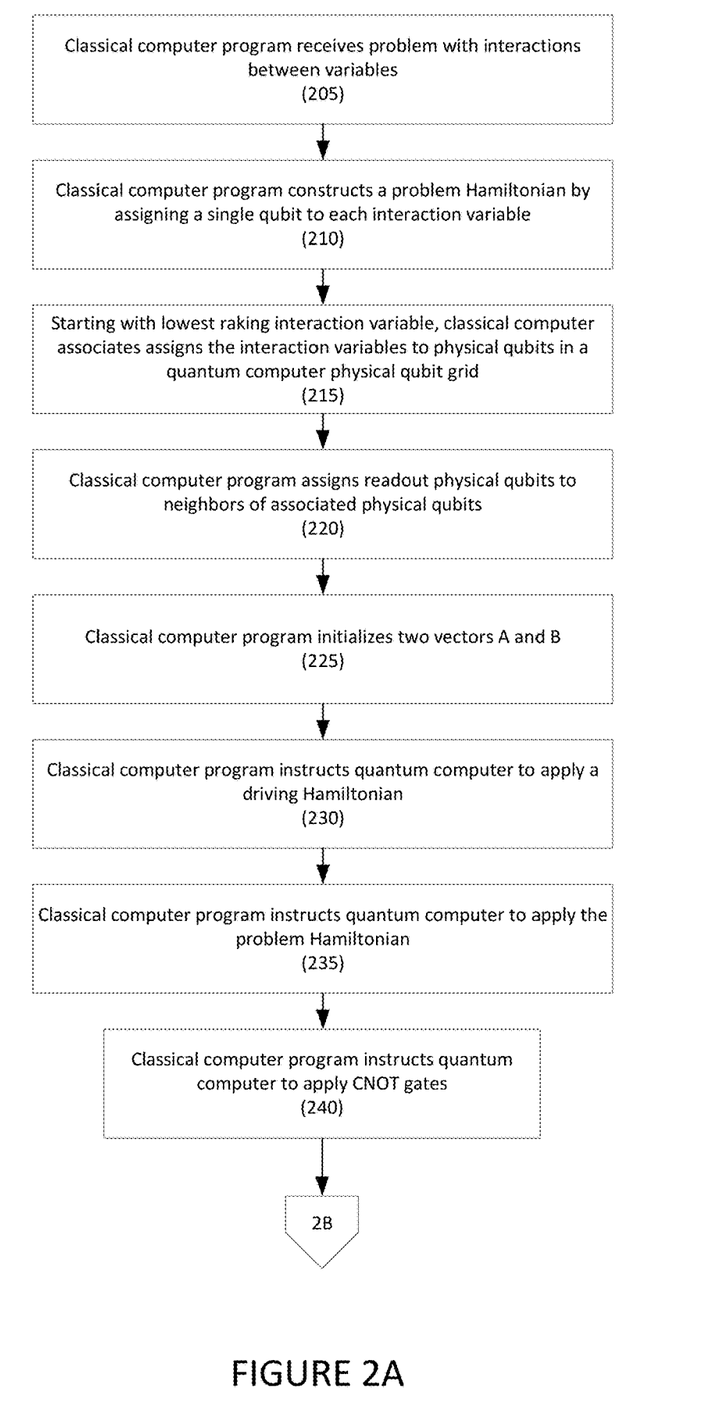
FIGS. 2A and 2B depict a method for implementing all-to-all connectivity in gate-based quantum computers using nearest-neighbor interactions according to one embodiment.
Figure 2B:
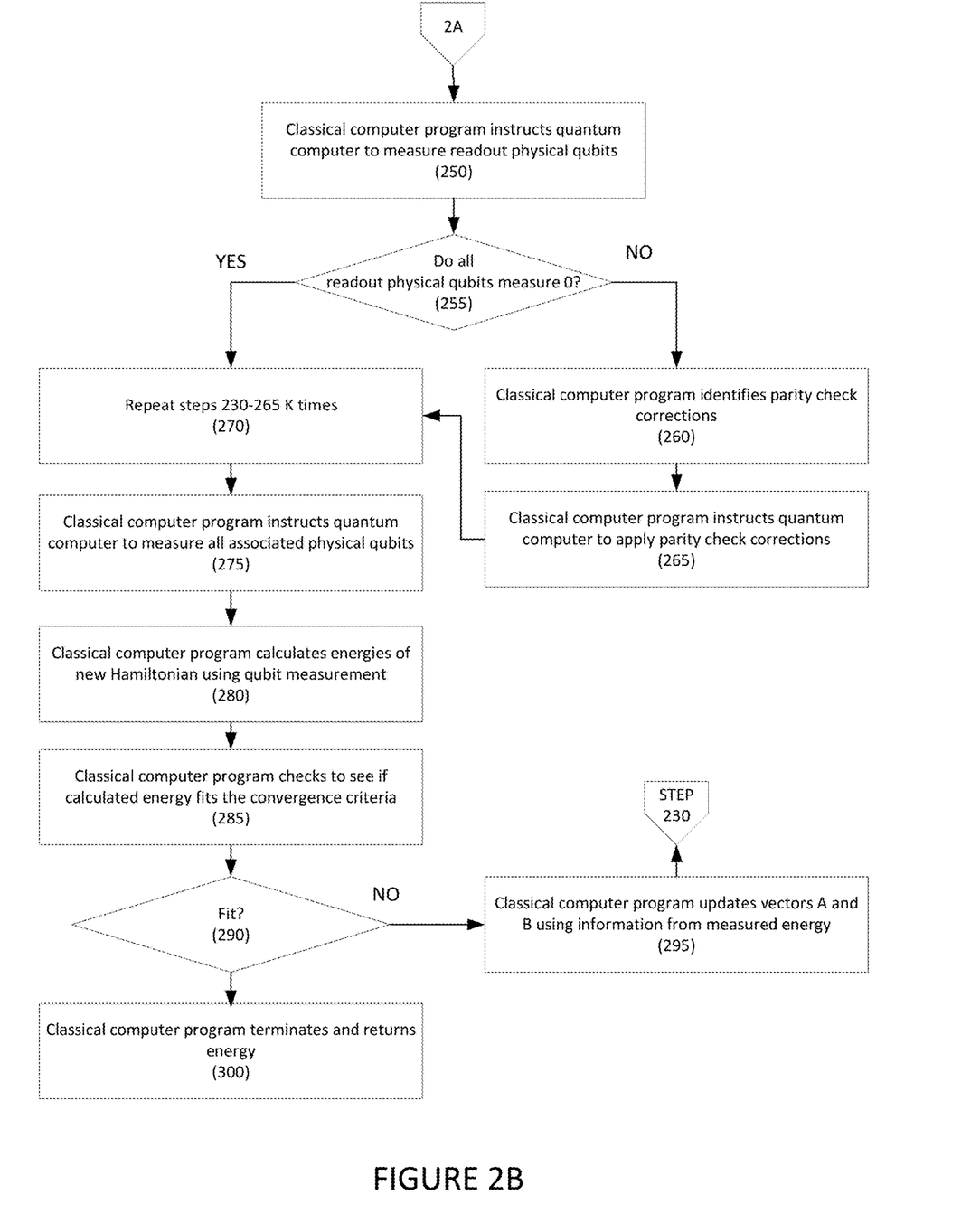

Referring to FIG. 2, a method for implementing all-to-all connectivity in gate-based quantum computers using nearest-neighbor interactions is disclosed according to an embodiment. In step 205, a classical computer program may receive a problem with interactions between variables. An example of such a problem is an optimization problem involving interactions between pairs of N binary variables.

Each variable in the problem may be denoted by the variable $s_i$, with $0 \leq i \leq N-1$. Interactions between two variables may be denoted by the product $s_i s_j$ for $0 \leq i, j \leq N-1$. For each interaction $s_i s_j$, an interaction variable, $t_{iN+j}$, may be created. There may be up to $N(N-1)/2$ interaction variables.

In embodiments, a precision parameter, K, may also be received. A larger value for K will lead to better optimization. As a non-limiting example, K may range from 2 to 10.

In step 210, the classical computer program may construct a problem Hamiltonian by assigning a single qubit to each interaction variable.

Figure 3:
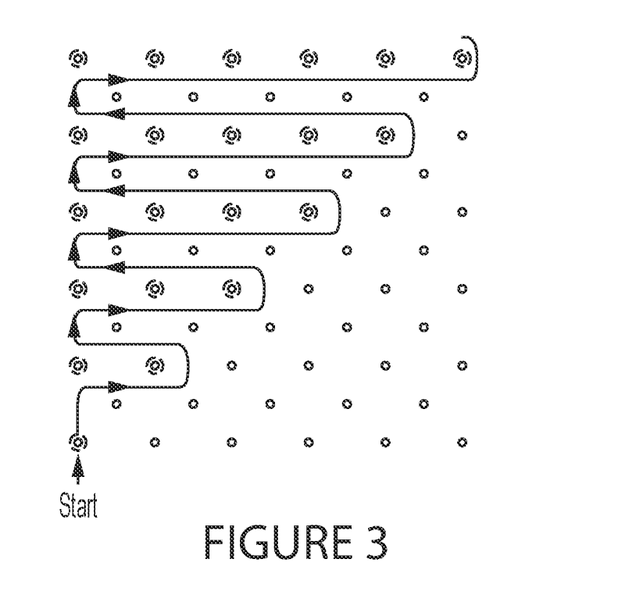
FIG. 3 depicts an exemplary qubit assignment methodology according to one embodiment.

In step 215, starting with lowest raking interaction variable, classical computer program may associate the interaction variables to physical qubits in a physical qubit grid. In one embodiment, the interaction variables, ti, may be assigned by traversing a physical qubit layout, skipping a row between any two rows of assignment. An illustration of an exemplary assignment process is provided in FIG. 3.

The skipped rows may be used to assign readout physical qubits for parity measurements.

Figure 4:
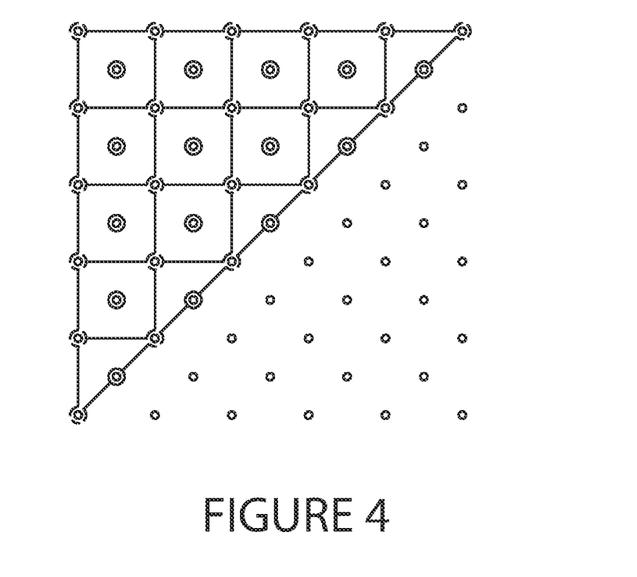
FIG. 4 depicts an exemplary qubit assignment layout with readout qubits according to an embodiment.

In step 220, the classical computer program may assign readout physical qubits to neighbors of associated physical qubits. This may result in a grid of triangles and squares with a physical qubit in the middle, such as that depicted in FIG. 4. The center physical qubits are readout physical qubits.

In step 225, the classical computer program may initialize two vectors, A and B. In embodiments, vectors A and B vectors may each be of length K and may be populated with real numbers. Vectors A and B contain information on how long to apply the driving Hamiltonian (i.e., step 230) and the problem Hamiltonian (i.e., step 235). For example, if the process is in step i of K iterations, the driving riving Hamiltonian is applied for time A[i], and the problem Hamiltonian is applied for time B[i].

The period of time of application may be a period of seconds.

Vectors A and B may be initialized to any suitable value; in one embodiment, as a non-limiting example, the vectors may be initialized to random real numbers between 0 and 1. Vectors A and B may be stored in classical memory, and the classical computer may use the values of the vectors to decide the duration of operation on the quantum computer.

In step 230, the classical computer program may instruct the quantum computer to apply a driving Hamiltonian, such as the following:

$$H_D = \sum_{j \in qubits} \sigma_x^{(j)}$$

where $\sigma_x$ represents an operation in the x direction. The driving Hamiltonian may be applied for a period of A[i], wherein i represents the current iteration.

In step 235, the quantum computer may apply the problem Hamiltonian to the physical qubits. The problem Hamiltonian may rotate all physical qubits around the x-axis, and may be applied for a period of B[i], wherein i represents the current iteration.

In step 240, the classical computer program may instruct the quantum computer to apply CNOT gates to the physical qubit grid. For example, for each triangle and square, the quantum computer may apply CNOT gates between the physical qubits on the edges and the physical qubit in the center (i.e., the readout physical qubit).

For example, a CNOT gate may perform the following actions on a pair of qubits: 00 to 00, 01 to 01, 10 to 11, and 11 to 10.

In step 245, the classical computer program may instruct the quantum computer to measure the readout physical qubits.

In step 250, if all readout qubits do not indicate that parities between qubits are enforced in the qubit grid, such as by measuring a value other than 0, in step 260, the classical computer program may identify parity check corrections, and in step 265, the classical computer program may instruct the quantum computer to apply the parity check correction(s). Examples of parity check corrections may include applying X or flipping gates on data (not readout) qubits, flipping a data-qubit (e.g., applying a X gate to that qubit) and flipping the parity measurement of the readout qubits surrounding that physical qubit, and identifying a combination of flips such that the readout qubits measure zero.

In one embodiment, the classical computer program may apply an algorithm that applies all possible parity corrections to identify one that results in all zeros. For example, if there are three physical qubits, the classical computer program may check the following combinations to identity one that fixes the parity: Flip 1, Flip 2, Flip 3, Flip 1, 2, Flip 1, 3, and Flip 2, 3.

In step 250, if the measurements of all readout physical qubits indicate that parities between qubits are enforced in the qubit grid, such as by measuring 0, or after parity check corrections have been applied in step 265, in step 270, steps 230-265 may be repeated a total of K times.

After K iterations, in step 275, the quantum computer program may measure all associated physical qubits, and in step 280, the classical computer program may calculate the energy of the problem Hamiltonian using this qubit measurement. In embodiments, the objective is to minimize the energy.

In step 285, the classical computer program may check to see if calculated energy fits the convergence criteria. For example, if the energy calculated in step 280 and the energy calculated in the last iteration of step 280 do not differ by more than a convergence parameter E (which may be received with the problem in step 205), the calculated energy may fit the convergence criteria.

In step 290, if the calculated energy does not fit the convergence criteria, in step 295, the classical computer program may update vectors A and B using information from the current calculated energy. For example, the value for vector A may be updated to apply the driving Hamiltonian for a longer time or a shorter time, and/or the value for vector B may be updated to apply the problem Hamiltonian for a longer time or a shorter time.

In embodiments, machine learning may be used to identify values for vectors A and B based on the comparison of the current calculated energy to the calculated energy from the prior iteration. An example of a suitable technique is a gradient-descent technique such as those disclosed in Ruder, Sebastian, "An overview of gradient descent optimization algorithms," arXiv preprint arXiv:1609.04747 (2016) and Sweke, Ryan, et al., "Stochastic gradient descent for hybrid quantum-classical optimization," Quantum 4 (2020): 314, the disclosures of which are hereby incorporated, by reference, in their entireties.

The process may return to step 230 with the updated values for vectors A and B. The iteration counter for K may be reset to its initial value.

In step 290, if the calculated energy fits the convergence criteria, in step 300 the classical computer program may terminate, and the calculated energy is returned.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

In one embodiment, the processing machine may be a classical computer, a quantum computer, etc.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, a memory stick, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for implementing all-to-all connectivity in gate-based quantum computers using nearest-neighbor interactions, comprising:
   receiving, by a classical computer program, an optimization problem comprising a plurality of interactions between pairs of variables;
   constructing, by the classical computer program, a problem Hamiltonian by assigning a qubit to each of the interactions between pairs of variables;
   associating, by the classical computer program, each of the assigned qubits in the problem Hamiltonian to a physical qubit in a physical qubit grid in a quantum computer;
   assigning, by the classical computer program, readout physical qubits in the physical qubit grid to neighbors of the associated physical qubits;
   instructing, by the classical computer program, the quantum computer to apply a driving Hamiltonian to the physical qubit grid;
   instructing, by the classical computer program, the quantum computer to apply the problem Hamiltonian to the physical qubit grid;
   instructing, by the classical computer program, the quantum computer to apply CNOT gates between associated physical qubits on edges of each triangle and square in the physical qubit grid and the readout physical qubits in centers of the triangles and squares;
   instructing, by the classical computer program, the quantum computer to measure the readout physical qubits; and
   determining, by the classical computer program, that the measurements of all readout physical qubits indicates that parities between the physical qubits are enforced in the physical qubit grid.

2. The method of claim 1, wherein the classical computer program associates each of the assigned qubits in the problem Hamiltonian with the physical qubit in the physical qubit grid by traversing the physical qubit grid and associating each assigned qubit with the physical qubit and skipping a row between any two rows of assignment and assigns readout physical qubits in the physical qubit grid to neighbors of the associated physical qubits.

3. The method of claim 1, further comprising:
   receiving, by the classical computer program, a precision parameter K; and
   repeating, by the classical computer program, steps of instructing the quantum computer to apply the driving Hamiltonian to the physical qubit grid, instructing the quantum computer to apply the problem Hamiltonian to the physical qubit grid, instructing the quantum computer to apply CNOT gates between associated physical qubits on edges of each triangle and square in the physical qubit grid and the readout physical qubits in centers of the triangles and squares K times.

4. The method of claim 1, further comprising:
   receiving, by the classical computer program, a precision parameter K; and
   initializing, by the classical computer program, a first vector and a second vector, each having a length of the precision parameter K, with a plurality of real number values;
   wherein the classical computer program instructs the quantum computer to apply the driving Hamiltonian for a period of one of the real number values in the first vector and to apply the problem Hamiltonian for a period of one of the real number values in the second vector.

5. The method of claim 1, further comprising:
   receiving, by the classical computer program, a convergence criteria;
   instructing, by the classical computer program, the quantum computer to measure all associated physical qubits;
   calculating, by the classical computer program, an energy for the problem Hamiltonian using the measurements of the associated physical qubits;
   determining, by the classical computer program, that the energy for the problem Hamiltonian fits the convergence criteria; and
   outputting, by the classical computer program, the energy for the problem Hamiltonian.

6. The method of claim 5, wherein the energy of the problem Hamiltonian fits the convergence criteria when the energy of the problem Hamiltonian is within a predetermined amount of a prior energy of the problem Hamiltonian for a prior iteration.

7. A method for implementing all-to-all connectivity in gate-based quantum computers using nearest-neighbor interactions, comprising:
   receiving, by a classical computer program, an optimization problem comprising a plurality of interactions between pairs of variables;
   constructing, by the classical computer program, a problem Hamiltonian by assigning a qubit to each of the interactions between pairs of variables;
   associating, by the classical computer program, each of the assigned qubits in the problem Hamiltonian to a physical qubit in a physical qubit grid in a quantum computer;
   assigning, by the classical computer program, readout physical qubits in the physical qubit grid to neighbors of the associated physical qubits;
   instructing, by the classical computer program, the quantum computer to apply a driving Hamiltonian to the physical qubit grid;
   instructing, by the classical computer program, the quantum computer to apply the problem Hamiltonian to the physical qubit grid;
   instructing, by the classical computer program, the quantum computer to apply CNOT gates between associated physical qubits on edges of each triangle and square in the physical qubit grid and the readout physical qubits in centers of the triangles and squares;
   instructing, by the classical computer program, the quantum computer to measure the readout physical qubits;
   determining, by the classical computer program, that the measurements of all readout physical qubits does not indicate that parities between the physical qubits are enforced in the physical qubit grid;

identifying, by the classical computer program, a parity check correction;

instructing, by the classical computer program, the quantum computer to apply the parity check correction to the physical qubit grid;

instructing, by the classical computer program, the quantum computer to measure the readout physical qubits a second time; and determining, by the classical computer program, that the second measurements of all readout physical qubits indicates that parities between the physical qubits are enforced in the physical qubit grid.

8. The method of claim 7, wherein the parity check correction comprises application of an X gate to one or more of the associated qubits and/or flipping of the measurement of one of the readout physical qubits.

9. The method of claim 7, wherein the classical computer program associates each of the assigned qubits in the problem Hamiltonian with the physical qubit in the physical qubit grid by traversing the physical qubit grid and associating each assigned qubit with the physical qubit and skipping a row between any two rows of assignment and assigns readout physical qubits in the physical qubit grid to neighbors of the associated physical qubits.

10. The method of claim 7, further comprising:
receiving, by the classical computer program, a precision parameter K; and
repeating, by the classical computer program, steps of instructing the quantum computer to apply the driving Hamiltonian to the physical qubit grid, instructing the quantum computer to apply the problem Hamiltonian to the physical qubit grid, instructing the quantum computer to apply CNOT gates between associated physical qubits on edges of each triangle and square in the physical qubit grid and the readout physical qubits in centers of the triangles and squares K times.

11. The method of claim 7, further comprising:
receiving, by the classical computer program, a precision parameter K; and
initializing, by the classical computer program, a first vector and a second vector, each having a length of the precision parameter K, with a plurality of real number values;
wherein the classical computer program instructs the quantum computer to apply the driving Hamiltonian for a period of one of the real number values in the first vector and to apply the problem Hamiltonian for a period of one of the real number values in the second vector.

12. The method of claim 7, further comprising:
receiving, by the classical computer program, a convergence criteria;
instructing, by the classical computer program, the quantum computer to measure all associated physical qubits;
calculating, by the classical computer program, an energy for the problem Hamiltonian using the measurements of the associated physical qubits;
determining, by the classical computer program, that the energy for the problem Hamiltonian fits the convergence criteria; and
outputting, by the classical computer program, the energy for the problem Hamiltonian.

13. The method of claim 12, wherein the energy of the problem Hamiltonian fits the convergence criteria when the energy of the problem Hamiltonian is within a predetermined amount of a prior energy of the problem Hamiltonian for a prior iteration.

14. A system, comprising:
a quantum computer; and
a classical computer configured to receive an optimization problem comprising a plurality of interactions between pairs of variables, to construct a problem Hamiltonian by assigning a qubit to each of the interactions between pairs of variables, to associate each of the assigned qubits in the problem Hamiltonian to a physical qubit in a physical qubit grid in a quantum computer, to assign readout physical qubits in the physical qubit grid to neighbors of the associated physical qubits, to instruct the quantum computer to apply a driving Hamiltonian to the physical qubit grid, to instruct the quantum computer to apply the problem Hamiltonian to the physical qubit grid, to instruct the quantum computer to apply CNOT gates between associated physical qubits on edges of each triangle and square in the physical qubit grid and the readout physical qubits in centers of the triangles and squares, and to instruct the quantum computer to measure the readout physical qubits.

15. The system of claim 14, wherein the classical computer is further configured to determine that the measurements of all readout physical qubits does not indicate that parities between the physical qubits are enforced in the physical qubit grid, identify a parity check correction, to instruct the quantum computer to apply the parity check correction to the physical qubit grid, to instruct the quantum computer to measure the readout physical qubits a second time, and to determine that the second measurements indicates that parities between the physical qubits are enforced in the physical qubit grid.

16. The system of claim 15, wherein the parity check correction comprises application of an X gate to one or more of the associated qubits and/or flipping of the measurement of one of the readout physical qubits.

17. The system of claim 14, wherein the classical computer is configured to associate each of the assigned qubits in the problem Hamiltonian with the physical qubit in the physical qubit grid by traversing the physical qubit grid and associating each assigned qubit with the physical qubit and skipping a row between any two rows of assignment and assigns readout physical qubits in the physical qubit grid to neighbors of the associated physical qubits.

18. The system of claim 14, wherein the classical computer is further configured to receive a precision parameter K and repeat instructing the quantum computer to apply the driving Hamiltonian to the physical qubit grid, instructing the quantum computer to apply the problem Hamiltonian to the physical qubit grid, instructing the quantum computer to apply CNOT gates between associated physical qubits on edges of each triangle and square in the physical qubit grid and the readout physical qubits in centers of the triangles and squares K times.

19. The system of claim 14, wherein the classical computer is further configured to receive a precision parameter K, to initialize a first vector and a second vector, each having a length of the precision parameter K, with a plurality of real number values, and to instruct the quantum computer to apply the driving Hamiltonian for a period of one of the real number values in the first vector and the problem Hamiltonian for a period of one of the real number values in the second vector.

20. The system of claim 14, wherein the classical computer is further configured to receive a convergence criteria, to instruct the quantum computer to measure all associated physical qubits, to calculate an energy for the problem Hamiltonian using the measurements of the associated physical qubits, to determine that the energy for the problem Hamiltonian fits the convergence criteria, and to output the energy for the problem Hamiltonian, wherein the energy of the problem Hamiltonian fits the convergence criteria when the energy of the problem Hamiltonian is within a predetermined amount of a prior energy of the problem Hamiltonian for a prior iteration.

\* \* \* \* \*